United States Patent [19]

Ostlinning et al.

[11] Patent Number: 4,598,144

[45] Date of Patent: Jul. 1, 1986

[54] PROCESS FOR THE PRODUCTION OF HIGH MOLECULAR WEIGHT, OPTIONALLY BRANCHED POLYARYLENE SULPHIDES

[75] Inventors: Edgar Ostlinning, Duesseldorf; Karsten Idel, Krefeld; Wolfgang M. Eisermann, Duesseldorf; Dieter Freitag, Krefeld, all of Fed. Rep. of Germany

[73] Assignee: Bayer Aktiengesellschaft, Leverkusen, Fed. Rep. of Germany

[21] Appl. No.: 710,557

[22] Filed: Mar. 11, 1985

[30] Foreign Application Priority Data

Mar. 23, 1984 [DE] Fed. Rep. of Germany ....... 3410642

[51] Int. Cl.$^4$ ............................................. C08G 75/14
[52] U.S. Cl. .................................................. 528/388
[58] Field of Search ........................................ 528/388

[56] References Cited

U.S. PATENT DOCUMENTS

| | | | |
|---|---|---|---|
| 4,056,515 | 11/1977 | Vidaurri | 528/388 |
| 4,066,632 | 1/1978 | Anderson | 528/388 |
| 4,071,509 | 1/1978 | Edmonds, Jr. | 528/388 |
| 4,282,347 | 8/1981 | Tieszen et al. | 528/388 |
| 4,331,801 | 5/1982 | Idel et al. | 528/388 |
| 4,362,864 | 12/1982 | Idel et al. | 528/388 |
| 4,368,321 | 1/1983 | Sherk et al. | 528/388 |
| 4,371,671 | 1/1983 | Anderson | 528/388 |
| 4,424,339 | 1/1984 | Idel | 528/388 |
| 4,433,138 | 2/1984 | Idel | 528/388 |
| 4,495,332 | 1/1985 | Shiiki et al. | 528/388 |
| 4,500,702 | 2/1985 | Ostlinning et al. | 528/388 |
| 4,501,884 | 2/1985 | Ostlinning et al. | 528/388 |

FOREIGN PATENT DOCUMENTS

| | | |
|---|---|---|
| 0065689 | 12/1982 | Fed. Rep. of Germany . |
| 0073526 | 3/1983 | Fed. Rep. of Germany . |
| 0109637 | 5/1984 | Fed. Rep. of Germany . |

*Primary Examiner*—Melvyn I. Marquis
*Attorney, Agent, or Firm*—Connolly & Hutz

[57] ABSTRACT

The present invention relates to a process for the production of high molecular weight, optionally branched polyarylene sulphides. These can be produced in a polar organic solvent in the absence of water in a reaction vessel cascade comprising from two to six reaction vessels.

10 Claims, No Drawings

PROCESS FOR THE PRODUCTION OF HIGH MOLECULAR WEIGHT, OPTIONALLY BRANCHED POLYARYLENE SULPHIDES

This invention relates to a process for the production of high molecular weight, optionally branched polyarylene sulphides. These can be produced in a polar organic solvent in the absence of water in a reaction vessel cascade comprising from two to six reaction vessels.

Polyarylene sulphides and the production thereof are known (c.f. for example, U.S. Pat. Nos. 2,513,188, 3,117,620, 3,354,835, 3,790,536, 3,839,301, 4,038,259, 4,038,260, 4,038,261, 4,038,262, 4,056,515, 4,060,520, 4,064,114, 4,282,247, DE-AS 2 453 485, 2 453 749, 2 623 333, 2 623 362, 2 623 363, DE-OS 2 930 710, 2 930 797, 3 019 732 and 3 030 488).

Continuous processes are also described (c.f. for example, U.S. Pat. Nos. 4,056,515, 4,060,520, 4,066,632 and DE-OS No. 3 213 628).

All these processes use water-containing starting materials which have to be at least partially dehydrated before the reaction in an extra reaction stage.

Thus, for example, the process according to DE-OS 3 030 488 uses alkali metal sulphides which have a water content of from 1 to 2.4 mols of water per mol of alkali metal sulphide. According to U.S. Pat. Nos. 4,056,515 and 4,060,520 there remains in the reaction mixture after pre-dehydration a water content of at least 1 mol per mol of S-donor. In U.S. Pat. No. 4,282,347 water is added to the reaction mixture after the dehydration stage in order to obtain a particular water content.

A particular advantage of all these processes is the fact that not all the reaction constituents are present during dehydration. The haloaromatic materials in particular together with some of the solvent are only added after pre-dehydration.

Gradual dehydration is, however, also possible during the reaction. Owing to the high reaction temperature (up to 280° C.) and the associated pressures (up to 20 bars), these reactions can only be carried out in expensive pressure apparatus.

However, a process has now been found for the production of high molecular weight, optionally branched polyarylene sulphides, which process is carried out under only slight excess pressure or under ambient pressure so that pressure apparatus are not required. In this process all the reaction constituents, including all the catalysts and/or co-solvents which are optionally used, are present from the very beginning, or the material to be dehydrated is introduced during the dehydration stage, and water is removed by distillation from the mixture. Reaction constituents which are optionally azeotropically distilled off are separated from water and reintroduced. The reaction mixture is then reacted in the individual reaction vessels at an increasing temperature.

The invention thus provides a process for the production of optionally branched polyarylene sulphides from (a) from 50 to 100 mol % dihaloaromatic materials corresponding to the following general formula:

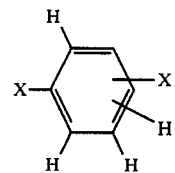

and from 0 to 50 mol % dihaloaromatic materials corresponding to the following general formula:

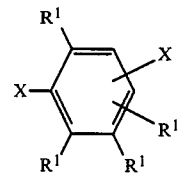

wherein

X represents halogen, such as chlorine or bromine, which are in the meta- or para- position to each other, and $R^1$ is the same or different and represents hydrogen, alkyl, cycloalkyl, aryl, alkylaryl, arylalkyl, and two radicals $R^1$ which are in the ortho-position to each other can be linked to form an aromatic or heterocyclic ring, and one radical $R^1$ is invariably other than hydrogen, (b) from 0 to 5 mol %, preferably from 0.1 to 2.5 mol %, based on the sum of the dihaloaromatic materials corresponding to formulae I and II, of a tri- or tetra-haloaromatic material corresponding to the following general formula:

$$ArX_n \qquad (III),$$

wherein

Ar is an aromatic or heterocyclic radical,

X represents halogen, such as chlorine or bromine, and n is 3 or 4, and (c) alkali metal sulphides, preferably sodium or potassium sulphide or a mixture thereof, preferably in the form of the hydrates or aqueous mixtures thereof, optionally together with alkali metal hydroxides, such as sodium and potassium hydroxide the molar ratio of (a+b):c being from 0.85:1 to 1.15:1, preferably from 0.90:1 to 1.10:1, in (d) an organic solvent, optionally with the simultaneous use of catalysts and/or co-solvents, the molar ratio of alkali metal sulphides (c) to the organic solvent (d) being from 1:2 to 1:15, characterised in that the reaction, which is optionally continuous, is carried out in a vessel cascade comprising from 2 to 6, preferably from 2 to 4 vessels, optionally under elevated pressure, such that the water in the mixture before the reaction, or in the preliminary phase of the reaction, is removed in the presence of all the reaction constituents and the reaction temperature is from 200° to 270° C., preferably from 200° to 250° C. and is continuously raised over the individual reaction vessels.

The reaction time can be varied within a broad range. It can be from less than one hour to several days, preferably from one hour to 48 hours, most preferably from 2 to 18 hours. The residence time of the reaction mixture in the individual vessels can be uniformly distributed or can be different.

Conventional materials can be used in conventional quantities as catalysts in this process, such as alkali metal fluorides, alkali metal phosphates and alkali metal carboxylates. From 0.02 to 1.0 mol of catalyst is used per mol of alkali metal sulphide.

N,N-Dialkyl carboxylic acid amides of $C_1$–$C_8$ aliphatic and $C_6$–$C_{12}$ aromatic carboxylic acids can for example be used as co-solvents in a quantity of from 0.02 to 1.0 mol, based on 1 mol of alkali metal sulphide, for example N,N-dimethyl-acetamide, N,N-diethylacetamide or N,N-dimethylpropionamide.

$R^1$ in formula II preferably represents hydrogen, $C_1$–$C_{20}$ alkyl, $C_5$–$C_{20}$ cycloalkyl, $C_6$–$C_{24}$ aryl, $C_7$–$C_{24}$ trialkyl-aryl or $C_7$–$C_{24}$ aralkyl. Moreover, two radicals $R^1$ in the ortho-position to each other can form a fused aromatic radical having a total of 6 carbon atoms or a fused heterocyclic ring having from 5 to 6 ring atoms and from 1 to 3 hetero-atoms, such as N, O and S.

Ar preferably represents an aromatic radical having from 6 to 24 carbon atoms or a heterocyclic radical having from 6 to 24 carbon atoms, most preferably an aromatic radical having from 6 to 10 carbon atoms or a heterocyclic radical having from 6 to 10 ring atoms, the heterocyclic radicals containing up to 3 hetero-atoms, such as N, S, O.

Meta- and para-dihaloaromatic materials corresponding to formula (I) or (II) can be used according to the present invention. In this case, the ratio of meta- to para-dihaloaromatic materials can be up to 30:70.

p-Dihaloaromatic materials are most preferably used to obtain thermoplastically-processable polyphenylene sulphides.

If branched polyarylene sulphides are to be produced, at least 0.05 mol % of a tri- or tetra- haloaromatic material corresponding to formula (III) can be used.

Alkali metal sulphides are used in conventional quantities and in conventional manner. Sodium and potassium sulphide, for example, are suitable. Alkali metal sulphides can be used which have been regenerated from hydrogen sulphides with alkali metal hydroxides, such as LiOH, NaOH and KOH. In each case mixtures of both the sulphides and hydroxides can be used.

The following are examples of dihaloaromatic materials corresponding to formula (I) which can be used according to the present invention:

p-difluorobenzene, p-dichlorobenzene, p-dibromobenzene, 1-chloro-4-bromobenzene, 1,3-dichlorobenzene, 1,3-dibromobenzene, and 1-chloro-3-bromobenzene. They can be used on their own or in admixture with each other. 1,4-Dichlorobenzene and/or 1,4-dibromobenzene are particularly preferred.

The following are examples of dihaloaromatic materials corresponding to formula (II) which can be used according to the present invention:

2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4,-dichlorotoluene, 2,4-dichloroxylene, 2,4-dibromocumene and 1-cyclohexyl-3,5-dichlorobenzene. They can be used individually or in admixture with each other.

The following are examples of tri- or tetra-haloaromatic materials corresponding to formula (III) which can be used according to the present invention: 1,2,3-trichlorobenzene, 1,2,4-trichlorobenzene, 1,2,4-tribromobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

Examples of organic solvents which are suitable for the present invention are lactams, such as N-alkyllactams, for example N-methylpyrrolidone, N-ethylpyrrolidone, N-methylpiperidone, N-isopropylpyrrolidone and N-methylcaprolactum.

The boiling point of the solvents should be 200° C. and above.

The reaction is generally carried out without applied pressure under atmospheric pressure. It may be advantageous in certain cases to use excess pressure of from 0.1 bar to 4 bars. It is also possible to have the same pressure in each vessel, that is to operate the entire cascade isobarically. It is also possible to fix different pressures in the individual vessels.

In carrying out the present process, all the reaction constituents can be introduced all at once in any order into the first reaction vessel of the vessel cascade (dehydration vessel). It is also possible to meter in water-containing constituents during the dehydration phase. Dehydration generally takes place at a temperature of from 160 to 210° C., and can optionally take place by applying a slight vacuum of >0.7 bars, so that the separation of smaller residual quantities of water is improved. The temperatures in the individual vessels of the cascade can be different. The temperatures can generally be selected such that the temperatures in the vessels differ by from 5° to 30° C. from stage to stage. A particular pressure can be set in each vessel to achieve specific temperatures.

A temperature of from 160° C. to 210° C. is set in the first reaction vessel. It is also possible to have a slowly-rising temperature in the vessel. The materials can be introduced continuously (steady state) into the next 4 reaction vessels when using a vessel cascade comprising at least five vessels, or relatively large batches thereof can be introduced at correspondingly large time intervals. Different temperature ranges can be fixed for each vessel depending on the number of reaction vessels, for example, by using a cascade as follows:

| Mode of operation | 1st vessel | 2nd vessel | 3rd vessel | 4th vessel | 5th vessel | 6th vessel |
| --- | --- | --- | --- | --- | --- | --- |
| 2 vessels | 160–220° C. | 220–250° C. | | | | |
| 3 vessels | 160–210° C. | 215–230° C. | 230–250° C. | | | |
| 4 vessels | 160–210° C. | 210–225° C. | 225–235° C. | 230–250° C. | | |
| 5 vessels | 160–210° C. | 210–220° C. | 220–235° C. | 230–240° C. | 235–250° C. | |

| Mode of operation | 1st vessel | 2nd vessel | 3rd vessel | 4th vessel | 5th vessel | 6th vessel |
|---|---|---|---|---|---|---|
| 6 vessels | 160–210° C. | 210–220° C. | 220–230° C. | 225–235° C. | 230–240° C. | 235–250° C. |

The residence time in each vessel depends on the reaction rate in each of the temperature ranges and can be the same or different, lasting up to 24 hours, preferably from 1 to 10 hours. The entire reaction time lasts up to 48 hours, preferably from 2 to 18 hours.

The reaction in the vessel cascade can be carried out continuously or discontinuously.

Working up of the reaction mixture and the isolation of the polyarylene sulphides can be effected in known manner.

The polyarylene sulphide can be directly separated from the reaction solution by conventional processes such as filtration or centrifugation, or only after addition of water and/or dilute acids for example. After the polyarylene sulphide has been separated there generally follows washing with water. Washing or extracting with other washing liquids which is carried out in addition to or subsequent to this washing is also possible.

The polyarylene sulphide can also be recovered by, for example, distilling off the solvent and subsequently washing as described above.

Working up can be carried out both continuously and discontinuously.

The polyarylene sulphides according to the present invention can be mixed with other polymers, pigments and fillers, such as graphite, metal powder, glass powder, quartz powder or glass fibres or with additives which are conventional for polyarylene sulphides, such as conventional stabilizers or mould-release agents.

The melt flow behaviour of polyarylene sulphides is generally measured according to ASTM 1238-70 at 316° C. using a 5 kg weight, and is given in g/10 minutes.

However, this measurement can cause difficulties with high melt flow values on account of the high discharge rate of the polymer melt.

For this reason the melt viscosity $\eta m$ of the polymer melt (in Pa.s) at 306° C. was determined as a function of the shearing stress (in Pa.s) using an Instron rotation viscosimeter.

The melt viscosity can be determined in a very wide range of from $10^{-1}$ to $10^7$ Pa.s in this manner. The polymer is melted between a solid plate and a rotable cone in the Instron rheometer and the turning moment of the cone is determined. The melt viscosity can be calculated as a function of the shearing stress from the turning moment, the angular velocity and the apparatus data. The model 3250 rheometer by Instron is used; the diameter of the cone and plate is 2 cm.

The melt viscosity which is measured at a shearing stress of $\eta = 10^2$ Pa is given.

The polyarylene sulphides according to the present invention generally have a melt viscosity of from $0.1 \times 10^2$ to $5.10^6$ Pa.s, preferably from $0.2 \times 10^3$ to $10^4$ Pa.s, and good colour properties directly after isolation from the reaction mixture. They can be directly processed by extrusion, extrusion blowing, injection moulding or other conventional processing techniques to produce films, mouldings or fibres. These can be used in conventional manner for parts of automobiles, fittings, electrical parts, such as switches, electronic plates, chemical-resistant parts and apparatus which are stable under the effects of weathering, such as pump housings and pump impellers, sheaths for etching baths, sealing rings, parts for office machines and telecommunication equipment, and for household devices, valves and ball bearing parts.

EXAMPLE 1

Use of an apparatus comprising 2 reaction vessels.

2000 g N-methylcaprolactam, 616.5 g sodium sulphide trihydrate ( 4.73 mols), 56 g 50% sodium hydroxide solution, 682.2 g 1,4-dichlorobenzene ( 4.64 mols), 4.21 g trichlorobenzene (0.5 mols %, based on dichlorobenzene) and 60.4 g N,N-dimethylacetamide are placed in a 4 l vessel which is provided with a thermometer, stirrer, column with a distillate-separator and a base blower. The mixture is slowly heated to boiling point. Water is separated from the distilling azeotropic mixture consisting of water and 1,4-dichlorobenzene and 1,4-dichlorobenzene is reintroduced into the reaction vessel. After a distillation time of 2 hours, at the end of which a slight vacuum is applied, no more water can be detected in the distillate or in the bottom. The reaction mixture is subsequently heated to 190° C. 400 g N-methylcaprolactam are placed in a second vessel and preheated to 230° C. The reaction mixture from vessel 1 is then continuously metered into vessel 2 at a temperature of from 225° to 230° C. The reaction mixture is then heated for a further 7 hours to reflux and the product is isolated in conventional manner. 481.1 g polyarylene sulphide (=96.0% yield, based on 1,4-dichlorobenzene) are obtained having a melt viscosity of $\eta m = 3.8 \times 10^2$ Pa.s (at $\tau = 10^2$ Pa).

EXAMPLE 2

Use of an apparatus comprising 4 vessels
Apparatus analogous to Example 1.

2000 g N-methylcaprolactam, 616.6 g sodium sulphide trihydrate, 682.2 g 1,4-dichlorobenzene, 76.1 g sodium acetate and 4.9 g 50% sodium hydroxide solution are placed in the first vessel and dehydrated as in Example 1. The mixture is then heated to 190° C. 150 g N-methylcaprolactam are placed in the second vessel and heated to 225° C. The reaction mixture is then metered in batchwise such that a temperature of from 215° to 220° C. is maintained. The reaction mixture then remains at 220° C. for 3 hours. 150 g N-methylcaprolactam are heated to 230° C. in the 3rd vessel and the contents from vessel 2 are added such that a temperature of from 225° C. to 230° C. is maintained. The mixture is then heated for 3 hours under reflux, the temperature rising to 235° C. 100 g N-methylcaprolactam are placed in the 4th vessel and heated to reflux. The contents of the 3rd vessel are metered in at a temperature of from about 230° to 235° C. It is then heated for 4 hours under reflux. 473.5 g polyphenylene sulphide ( 94.5% yield, based on 1,4-dichlorobenzene) having a melt viscosity of $\eta m = 140$ Pa.s (at $\tau = 10^2$ Pa) are obtained.

EXAMPLE 3

Use of an apparatus comprising 6 vessels.
Apparatus analogous to Example 2, with the following modifications:

| Vessel No | Metering temperature | Holding temperature | starting solution NMC* | Hours |
|---|---|---|---|---|
| 1 | — | 205° C. | — | — |
| 2 | 210–215° C. | 215° C. | 100 g | 3 |
| 3 | 220–225° C. | 225° C. | 100 g | 3 |
| 4 | 225–230° C. | 230° C. | 100 g | 2 |
| 5 | 230–235° C. | 235° C. | 100 g | 3 |
| 6 | 235° C. | RF** | — | 2 |

*NMC = N—methylcaprolactam
**RF = Reflux

Weighed sample as in Example 1. 473.7 g polyarylene sulphide are obtained ( 94.5% yield, based on 1,4-dichlorobenzene) having a melt viscosity of $\eta m = 590$ Pa.s (at $\tau = 102$ Pa).

EXAMPLE 4

Use of an apparatus comprising 4 vessels in the steady-state method. Vessels 2 to 4 are provided additionally with excess pressure control for setting the temperature. Vessel 1 is installed twice.

| Vessel no | Temperature | Pressure | Reaction mixture |
|---|---|---|---|
| 1a | 200° C. | 1 bar | Weighed sample (or vice versa) |
| 1b | dehydration | | |
| 2 | 220° C. | 1–1.4 bars | 3000 g |
| 3 | 230° C. | 1–1.8 bars | 3000 g |
| 4 | 240° C. | 1–1.5 bars | 4000 g |

Weighed sample as in Example 2, except that it additionally contains 400 g N-methylcaprolactam and 7.16 g 1,2,4-trichlorobenzene (0.85 mol %, based on 1,4-dichlorobenzene). The throughput of vessel 1 to 2, 2 to 3 and 3 to 4 is 1000 g.

At a continuous throughput, 136.3 g polyarylene sulphide ( 96.1% yield, based on 1,4-dichlorobenzene) having a melt viscosity of $\eta m\ 3 \times 10^3$ Pa.s (at $\tau = 10^2$ Pa) are obtained in one hour.

In order to guarantee this continuous throughput, dehydration or heating to 200° C. are alternately carried out in vessels 1a or 1b.

EXAMPLE 5

As in Example 4, but with a throughput of 1000 g/h in 10 batches each of 100 g.

125.9 g polyarylene sulphide ( 95.8% yield, based on 1,4-dichlorobenzene) having a melt viscosity of $\eta m = 9.8 \times 10^2$ Pa.s (at $\tau = 10^2$ Pa) are obtained.

We claim:

1. A process for the production of a high molecular weight polyarylene sulfide comprising first, forming a reaction mixture of
   (a) 50 to 100 mol % of a first dihaloaromatic material corresponding to the formula:

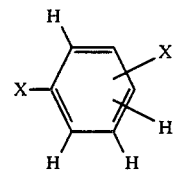

and 0 to 50 mol % of a second dihaloaromatic material corresponding to the formula:

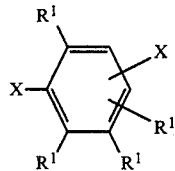

wherein
X are halogen in the meta- or para- position to one another, and
$R^1$ can be the same or different and is hydrogen, alkyl, cycloalkyl, aryl, alkylaryl, arylalkyl, or two radicals $R^1$ in the ortho- position to each other linked together to form an aromatic or heterocyclic ring and one radical $R^1$ is invariably other than hydrogen,
   (b) from 0 to 5 mol %, based on the sum of components (a) and (b), of a tri-or tetra-haloaromatic material corresponding to the formula:

$ArX_n$ wherein
Ar is an aromatic or heterocyclic radical,
X is halogen, and
n is 3 or 4
   (c) an alkali metal sulfide or mixture thereof with an alkali metal hydroxide, the molar ratio of (a+b):c being from 0.85:1 to 1.15:1, and
   (d) a polar organic solvent or mixture thereof with a catalyst, the molar ratio of the alkali metal sulfide (c) to the polar organic solvent (d) being from 1:12 to 1:15, and removing substantially all the water from the reaction mixture and second, reacting the dehydrated reaction mixture at a temperature from 160° to 270° C. in a vessel cascade comprising 2 to 6 vessels, where the reaction temperature is continuously raised over the individual reaction vessels.

2. A process according to claim 1, wherein the reaction temperature is from 200° C. to 250° C.

3. A process according to claim 1, wherein the reaction temperature is raised by from 5° to 30° C. from one reaction vessel to the next reaction vessel.

4. A process according to claim 1, wherein the pressure ranges from atmospheric pressure to about 4 bar above atmospheric pressure.

5. A process according to claim 1, wherein the process is continuous.

6. A process according to claim 1, wherein N-methylcaprolactum is used as the polar organic solvent.

7. A process according to claim 1, wherein an alkali metal carboxylate is used as the catalyst.

8. A process according to claim 1, further comprising the reaction mixture contains an N, N-dialkyl carboxylic acid amide.

9. A process according to claim 1, wherein 1,4-dichlorobenzene is the first dihaloaromatic material.

10. A process according to claim 1, wherein 1,2,4-trichlorobenzene is the second polyhaloaromatic material.

* * * * *